United States Patent
Ellison et al.

(10) Patent No.: US 7,246,235 B2
(45) Date of Patent: Jul. 17, 2007

(54) TIME VARYING PRESENTATION OF ITEMS BASED ON A KEY HASH

(75) Inventors: Carl M. Ellison, Portland, OR (US); Stephen H. Dohrmann, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 1038 days.

(21) Appl. No.: 09/896,088

(22) Filed: Jun. 28, 2001

(65) Prior Publication Data
US 2003/0014637 A1    Jan. 16, 2003

(51) Int. Cl.
*H04L 9/32* (2006.01)
*H04L 9/00* (2006.01)

(52) U.S. Cl. ............ 713/168; 380/203; 380/36; 380/43; 380/44

(58) Field of Classification Search ........ 713/168; 380/203, 36, 43, 44
See application file for complete search history.

(56) References Cited

U.S. PATENT DOCUMENTS

| | | | |
|---|---|---|---|
| 4,033,053 A * | 7/1977 | Engler | 434/114 |
| 5,224,160 A | 6/1993 | Paulini et al. | |
| 5,425,020 A * | 6/1995 | Gregg et al. | 370/252 |
| 5,530,757 A | 6/1996 | Krawczyk | |
| 5,596,641 A | 1/1997 | Ohashi et al. | |
| 5,889,861 A * | 3/1999 | Ohashi et al. | 380/247 |
| 5,940,513 A | 8/1999 | Aucsmith et al. | |
| 6,131,162 A | 10/2000 | Yoshiura et al. | |
| 6,211,870 B1 | 4/2001 | Foster | |
| 6,216,004 B1 * | 4/2001 | Tiedemann et al. | 455/442 |

(Continued)

FOREIGN PATENT DOCUMENTS

EP    1128597 A1    8/2001

(Continued)

OTHER PUBLICATIONS

Rivest, R., "SDSI—A Simple Distributed Security Infrastructure," Sep. 15, 1996, Laboratory for Computer Science, Massachusetts Institute of Technology, http://theory.lcs.mit.edu/~rivest/sdsi10.html, pp. 1-41.

(Continued)

Primary Examiner—Nasser Moazzami
Assistant Examiner—Eleni Shiferaw
(74) Attorney, Agent, or Firm—Blakely, Sokoloff, Taylor & Zafman LLP

(57) ABSTRACT

A method for key verification through time varying item presentation based on a key hash result comprises generating a key hash result partially based on both a global identifier provided from a source and an estimated current time at that source. After generating the key hash result, a first time-varying item is produced using the key hash result as an index for a table lookup or generated based on Certain bit patterns forming the key hash result. Thereafter, the first time-varying item is presented for comparison with a second time-varying item being contemporaneously presented at the source. These computations are repeated, giving the impression of two views or instances of the same time-varying item. An attacker might be able to match one small portion of such a time sequence of presentations, by luck, but not any large portion of the sequence.

32 Claims, 4 Drawing Sheets

U.S. PATENT DOCUMENTS

| | | | |
|---|---|---|---|
| 6,339,429 | B1 | 1/2002 | Schug |
| 6,430,608 | B1 * | 8/2002 | Shaio ................... 709/217 |
| 6,553,029 | B1 * | 4/2003 | Alexander ............. 370/389 |
| 6,601,172 | B1 * | 7/2003 | Epstein ................. 713/178 |
| 6,661,810 | B1 * | 12/2003 | Skelly et al. ........... 370/516 |
| 6,664,969 | B1 * | 12/2003 | Emerson et al. ........ 345/544 |
| 6,694,434 | B1 | 2/2004 | McGee |
| 6,741,852 | B1 | 5/2004 | Mohrs |
| 6,804,506 | B1 | 10/2004 | Freitag et al. |
| 6,996,273 | B2 | 2/2006 | Mihcak et al. |
| 2001/0016909 | A1 * | 8/2001 | Gehrmann ............. 713/171 |
| 2003/0095664 | A1 * | 5/2003 | Asano et al. ........... 380/277 |

FOREIGN PATENT DOCUMENTS

| | | |
|---|---|---|
| WO | WO 98/49855 | 11/1998 |

OTHER PUBLICATIONS

Ellison, C., et al., "SPKI Certificate Theory," Sep. 1999, Network Working Group, RFC 2693, www.ietf.org/rfc/rfc2693.txt, pp. 1-38.

Diffie, Whitfield and Hellman, Martin E., New Directions in Cryptography, IEEE Transactions on Information Theory, Nov. 1976, pp. 644-654, vol. IT-22(6).

Housley, R., et al., Internet X.509 Public Key Infrastructure Certificate and CRL Profile, Request for Comments: 2459, www.ietf.org/rfc/ref2459.txt, p. 1-113.

Eleen Frisch, "Email Security That's Good Enough", RS/ Magazine Online, Feb. 1997, pp. 16-20, XP002266633, <URL:http://swexpert.com/C5/RS.C2.FEB.97.pdf> retrieved on Feb. 12, 2004.

AJ Menes, PC Van Oorschot, Sa Vanstone, "Handbook of Applied Cryptography", pp. 359-364, 1997 CRC Press, Boca Raton, XP-002266634.

* cited by examiner

TIME VARYING PRESENTATION OF ITEMS BASED ON A KEY HASH

FIELD

This invention relates to the field of data security. In particular, the invention relates to a key verification technique.

GENERAL BACKGROUND

As the number of electronic resources proliferate, the demand for applications to facilitate communications between such resources will also increase. Such applications can include electronic commerce but also secure sharing of data through encrypted or digitally signed electronic mail (e-mail) or secure access to resources through file sharing or remote computer log-on. All of these uses of cryptography require the authentication of users and other data prior to performance of a particular action. That is, it requires a level of trust to be established prior to performance of the transaction.

Specifically, in this networking age, a person is normally authenticated not by personal appearance but rather by use of a cryptographic key. In order for a particular key to correctly represent some person (or other entity), the party accepting the key would need to establish that the particular key is controlled by that person or entity. This process is normally referred to as "key verification". Current key verification techniques are either inadequate and therefore prone to error or abuse or they are so unusual and technical that an average human user might shy away from that activity.

For instance, one key verification technique (referred to as "directory verification" and first described in an Institute of Electronic and Electrical Engineering (IEEE) Transaction on Information Theory publication entitled "New Directions in Cryptography" by Whitfield Diffie and Martin Hellman (November 1976, pp. 644–654)) involves the publication and global distribution of a printed reference that includes the name, address and assigned public key for each user. The reference is published by a trusted source and distributed in a secure manner. One of many disadvantages of the directory verification technique is that it is costly to implement. Namely, this technique would incur additional costs for publication of the reference, secure distribution of the reference, and for each listed keyholder in the directory, the proof to the trusted source that the user is the true owner of the public key prior to publication. Another disadvantage is that the names of the users may be unique in a small group, but such uniqueness diminishes for larger groups. Hence, as the size of the group gradually expands, name collisions are almost certain to occur. When names collide, any party relying on the directory's results will not always be able to locate the correct directory entry for a desired person or other entity with certainty and therefore be not always able to locate that person's or entity's public key.

Other key verification techniques include the exchange of a digital certificate in accordance with, for example, Request For Comment (RFC-2459) entitled "Internet X.509 Public Key Infrastructure" (January 1999). However, the X.509 mechanism also suffers from the requirement of a central trusted source and increased costs for establishing such a certificate mechanism. It also suffers from name collision with the added disadvantage that when names collide, the user of a certificate may not be aware of the collision because he or she sees only the one directory line item contained within the certificate at hand and not the neighboring region of the directory.

Yet another key verification technique has been established by the application program referred to as "Pretty Good Privacy" (PGP). The idea of PGP key verification is to bind a public key of an owner to his or her global name, such as an e-mail address, for example, without the cost of a central trusted source. PGP allows every user to generate his or her own keys and certificates. For key verification purposes, PGP computes a fingerprint of the key to be verified, in the form of a cryptographic hash result of that key. This hash result is computed independently by the keyholder's copy of PGP and the relying party's copy of PGP. These cryptographic hash results, displayed either in the form of a long hexadecimal number or a sequence of English words, are then compared by having one party read the value to the other. If the values match, then the key in question is verified.

The PGP key verification technique has the disadvantage that the technique of visually or audibly comparing a number of hexadecimal character values or a string of meaningless words is quite time consuming and strange for the user who wants to achieve appropriate authentication levels. Because of that workload, some users skip the verification step entirely.

BRIEF DESCRIPTION OF THE DRAWINGS

The features and advantages of the invention will become apparent from the following detailed description in which.

DETAILED DESCRIPTION

Figure 1:
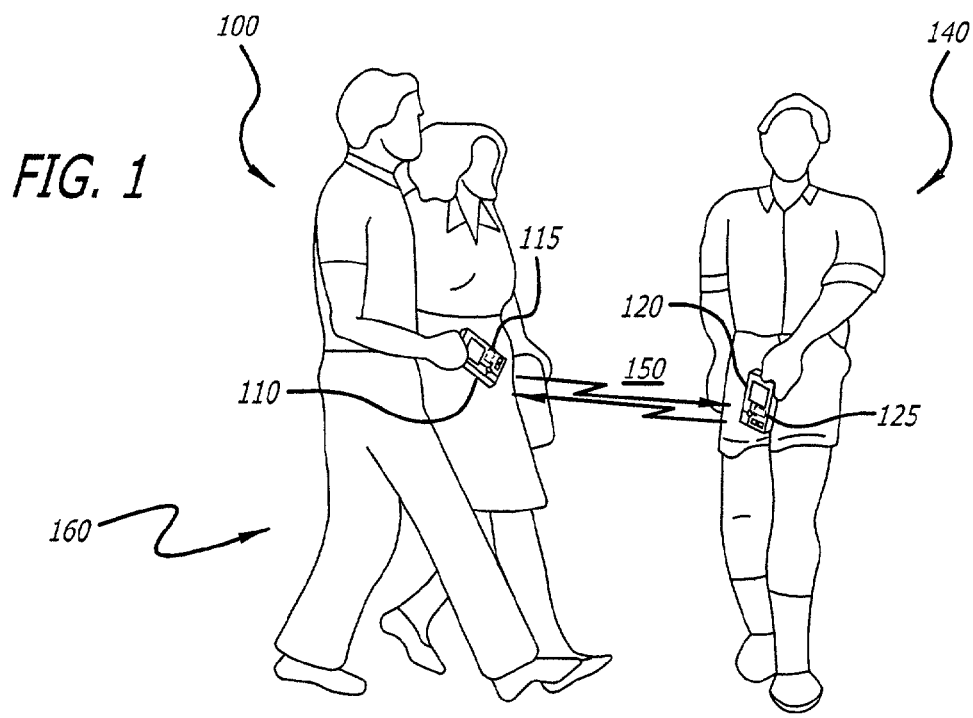
FIG. 1 is an exemplary embodiment of two parties that are performing operations in accordance with one embodiment of the key verification technique.

The invention relates to a computing unit and method for key verification through time varying item presentation based on a key hash result. Such time varying item presentation may include (1) successive selection/generation and graphical display of selected images or characters, (2) successive selection/generation and play back of audible sound(s) such as musical note(s), pronounceable syllables, or (3) any other sorts of periodic sensory presentations. In one embodiment, a source (first computing unit) is configured to transmit at least a global identifier and a current local time realized at the source. These parameters (or related variations thereof) may undergo a periodic cryptographic hash function at a destination (second computing unit) to produce a time varying key hash result. The same process is performed at the source. The periodic key hash result is used at both the source and the destination to periodically select or generate items for presentation that are substantially contemporaneous. An observer who is engaged in key verification then senses both the source and the destination simultaneously and can determine by the apparent simultaneity of these time-varying items produced by each that the global identifiers (typically keys) at the source and destination are the same. The longer the observer monitors these time varying items, the more certain he or she is that the two keys are identical.

Herein, certain terminology is used to describe certain features of the invention. For example, a "computing unit" may generally be considered as hardware, software, firmware or any combination thereof that is configured to process information and enable items to be presented to and perceived by the user. Some illustrative examples of a computing unit include a computer (e.g., laptop, hand held, etc.), a wireless telephone handset, alphanumeric pager or any other portable communication device.

When the computing unit is employed as software, such software features a plurality of software modules, each being instructions or code that, when executed, perform certain function or functions. The software is stored in platform readable medium, which is any medium that can store information. Examples of "platform readable medium" include, but are not limited or restricted to a programmable electronic circuit, a semiconductor memory device, a volatile memory (e.g., random access memory, etc.), a non-volatile memory (e.g., read-only memory, flash memory, etc.), a floppy diskette, a compact disk, an optical disk, a hard drive disk, or any other medium determined to be statutory.

In addition, a "packet" is generally considered herein as a collection of data in a selected format. The packet may be configured as a data stream having a varying bit length or bit segment of a predetermined length. A "key" is normally an encoding and/or decoding parameter. One type of key is a "public key" that need not be kept secret and therefore may also be used to identify a computing unit or its user. The cryptographic hash result of a key (either public or symmetric/secret), assuming the hash is noninvertible and non-colliding, can also be used as an identifier for a computing unit or its user. The term "contemporaneous" means at the same time or generally about the same time with a nominal latency (e.g., less than one second).

Referring now to FIG. 1, an exemplary embodiment of two parties that are performing operations in accordance with one embodiment of the key verification technique is shown. Herein, a first user (sender) 100 is in close physical proximity to a second user (receiver) 140. This allows a computing unit 110 of the sender 100 to communicate with a computing unit 120 of the receiver 140 over a link 150. As shown, the link 150 is any communication pathway over a wired/wireless information-carrying medium (e.g., electrical wire, optical fiber, cable, bus, radio frequency "RF", infrared "IR" or another wireless communication scheme such as Bluetooth™, past or future Institute of Electrical and Electronics Engineers (IEEE) 802.11 standards published Nov. 16, 1998 and entitled "Wireless LAN Medium Access Control (MAC) and Physical Layer (PHY) specifications" or any future related standards.

As generally shown, the first computing unit 110 uniquely stores data that is used to identify itself or the sender 100. This identification data is referred to as a "global identifier" 115. In one embodiment, a cryptographic public key (PUK1) is just one type of global identifier. Similarly, the second computing unit 120 is configured to store a global identifier 125 that differs from global identifier 115, such as a different cryptographic public key (PUK2) for example.

The first computing unit 110 is capable of broadcasting a verification packet including its global identifier (e.g., PUK1) to all other computing units that are able to receive the broadcast information. When the broadcast is conducted over a wireless medium, all computing units within a specific geographic area 160 and tuned into a certain frequency may receive the verification packet from the first computing unit 110. However, when the broadcast is conducted over a wired medium, all computing units coupled directly or indirectly to the wired medium may receive the verification packet from the first computing unit 110. In the situation where the wired medium is the Internet, any computing unit having access to the Internet may receive the verification packet.

Figure 2:
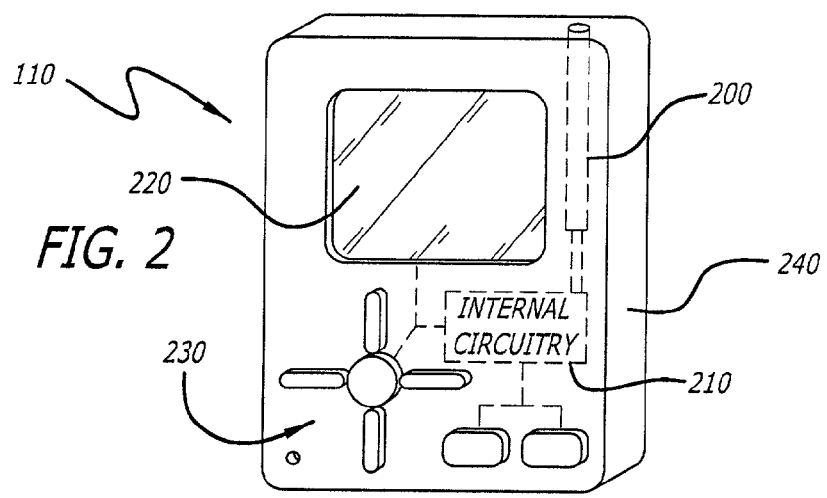
FIG. 2 is an exemplary embodiment of a computing unit in which one embodiment of the invention can be practiced.

Referring now to FIG. 2, an illustrative embodiment of one of the computing units (e.g., computing unit 110) is shown. For illustrative purposes, the computing unit 110 comprises an input/output (I/O) interface 200, internal circuitry 210, a display screen 220 and a keypad 230 integrated into a casing 240. The casing 240 is made of an inflexible material such as hardened plastic, and thus, protects the internal circuitry 210 from damage and contaminants.

More specifically, the I/O interface 200 enables the reception of incoming data and the transmission of outgoing data. In one embodiment, as shown, the I/O interface 200 may be implemented as an antenna and perhaps transceiver logic for transmitting and/or receiving verification packets as RF-based signals. Of course, other embodiments of the I/O interface 200 may include, but are not limited or restricted to a wired or wireless modem logic, a light emitting diode (LED) transmitter and/or receiver to transfer data through light pulses, and the like. As shown, the internal circuitry 210 controls the I/O interface 200 and the display screen 220 in response to incoming data from the I/O interface 200 and/or the keypad 230. For instance, the internal circuitry 210 may be used to adjust time displacement to cancel any perceived delay between presentation of identical items at computing units 110 and 120 to achieve exact simultaneity. Examples of the internal circuitry 210 include one or more of the following: processor (e.g., microprocessor, application specific integrated circuit, digital signal processor, or micro-controller), memory (nonvolatile or volatile), combinatorial logic, clocking circuit and the like.

As shown, the display screen 220 is a flat panel screen (e.g., liquid crystal display) although any type of display screen may be used. While the display screen 220 may be used as an output device in one embodiment, it is contemplated that the display 220 may be implemented as a touch screen display, thereby operating as an I/O device. For that embodiment, the keypad 230 may be removed. Alternatively, it is contemplated that the computing unit 110 may be implemented with any mechanism or combination of mechanisms that would allow persons to sense time-varying item presentation. For instance, although the computing unit is shown with a display screen, it is contemplated that the computing unit may be implemented with speakers to provide an audio interface in addition to or in lieu of the display screen. This would allow presentation of time-varying audible sounds. Similarly, the computing unit may be implemented with a tactile device to allow one to compare time-varying patterns by placement of a hand on both computing units.

Figure 3:
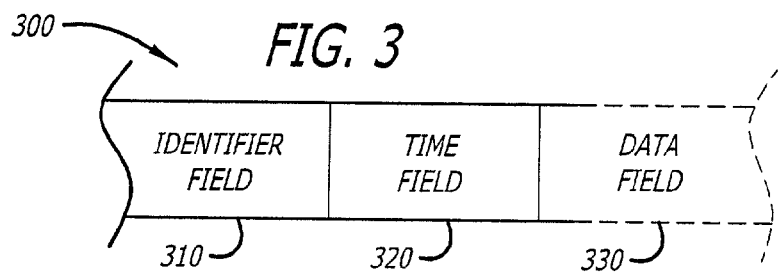
FIG. 3 is an exemplary embodiment of a data structure for a verification packet of the key verification technique practiced in FIG. 1.

Referring now to FIG. 3, an exemplary embodiment of a data structure for a verification packet 300 of the key verification technique is illustrated, As shown for this embodiment, the verification packet 300 is transmitted from the first computing unit. Herein, the verification packet 300 includes a plurality of fields; namely, an identifier field 310 and a time field 320. Other optional fields may include, but are not limited or restricted to a data field 330.

Herein, the identifier field 310 includes a global identifier for the source; namely, the sender or the first computing unit used by the sender. In one embodiment, the global identifier may be a public key corresponding to a private key held and controlled by the sender or his/her computing unit. For this exemplary embodiment, the identifier field 310 may include PUK1.

The time field 320 includes a value such as the time at which the verification packet 300 is formed by the first computing unit. As subsequent verification packets are formed and transmitted, the time field 320 of those packets will have different values. The data field 330 includes information that is to be transferred between computing units. Examples of such information may include, but are not limited or restricted to software (e.g., application, applet or any segment of code), a table of items (e.g., images, bit patterns, data representative of audible sound patterns, etc.) or any data to assist in the presentation of time-varying items.

Figure 4:
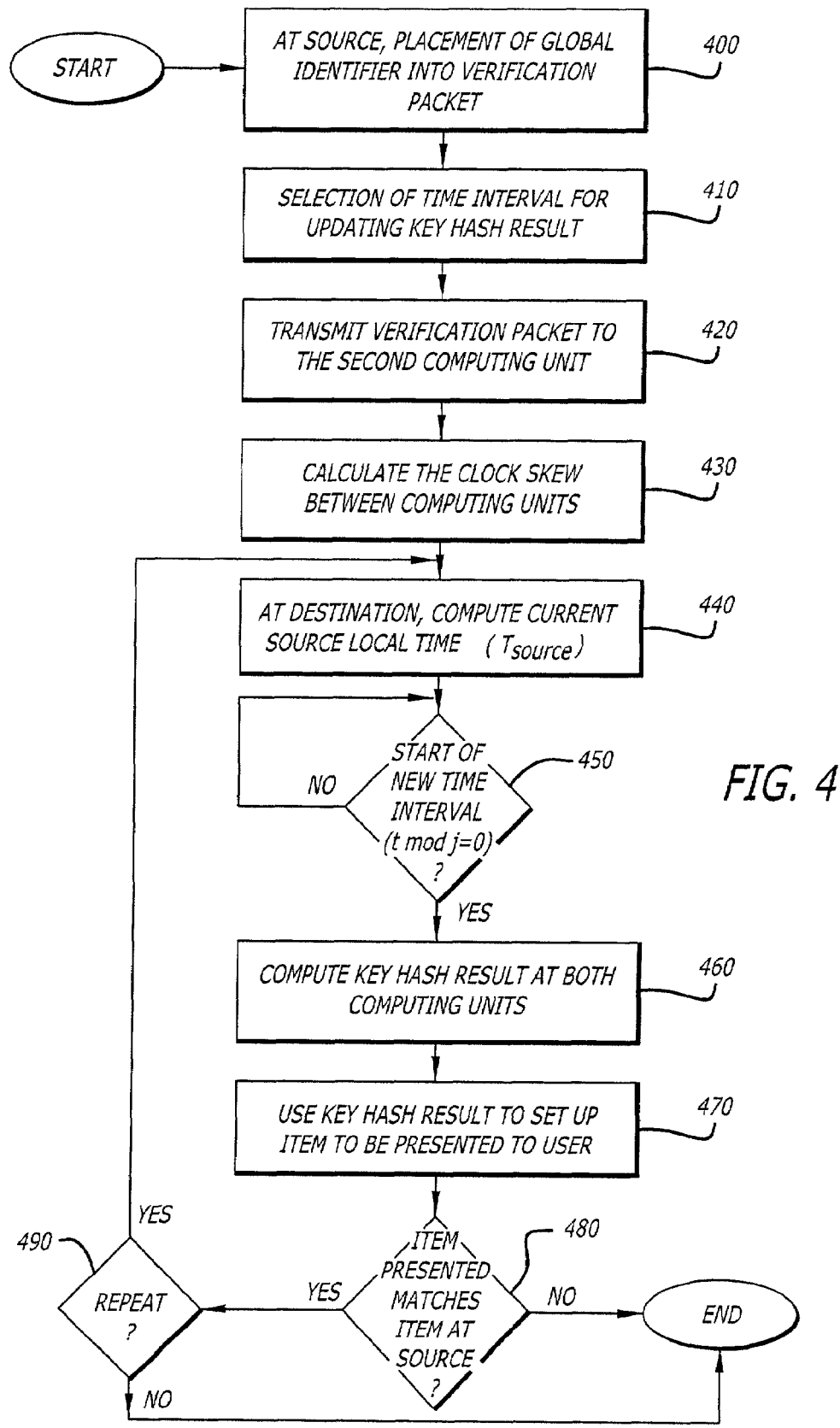
FIG. 4 is an exemplary embodiment of a flowchart outlining the operations performed in accordance with the key verification technique using a time varying item presentation.

Referring now to FIG. 4, an exemplary embodiment of a flowchart outlining the operations performed in accordance with the key verification technique using a time varying item presentation is shown. First, initialization operations are performed prior to transmission of the verification packet from a source to a destination. One initialization operation involves placement of a global identifier associated with the source in the verification packet (see block 400). Another initialization operation involves the selection of a time interval (TI) for updating the key hash result by the sender and the receiver (see block 410). The selection may be accomplished through a prior agreement (e.g., hard coded into software running this application) or by inclusion of the time interval with the verification packet (e.g. part of the data field). Selected in seconds or fractions thereof, this time interval determines the period at which an item is presented by the computing unit. For example, the time interval may determine when another image is illustrated on the display of the computing units, when an audible sound is played back from speakers integrated within or coupled to the computing units and the like.

At blocks 420 and 430, the verification packet is transmitted to the second computing unit, which computes a clock skew between these computing units. In particular, for one embodiment, the clock skew may be computed by the second computing unit recording the time upon which the transmitted verification packet is received and determining a difference between this receipt time and a local time realized at the first computing unit when the verification packet is being formed (hereinafter referred to as the "original source time"). The original source time is contained in the time field of the verification packet. After computing the clock skew, as shown in block 440, the second computing unit can estimate, within a small error range corresponding to the time it took to deliver the verification packet from the source to the destination, a current local time at the source ($T_{source}$) as it corresponds to the local time at the second computing unit.

At every time interval (TI), namely when the current source local time ($T_{source}$) equals zero modulo TI (e.g., $T_{source}$ mod TI=0), both ($T_{source}$) and the global identifier for the source ($ID_s$) undergo a cryptographic hash operation at both the first computing unit and the second computing unit. The result of the cryptographic hash operation produces a key hash result (see blocks 450 and 460). For one embodiment, the key hash result ($h_t$) is produced by a random cryptographic function "H(x,y)" as set forth below in equation (1).

$$h_t = H(ID_s, T_{source}), \text{ where} \qquad (1)$$

"$ID_s$ is a global identifier of the source (e.g., a public key), and

"$T_{source}$" is the current local time at the source at the beginning of the current time interval.

For this embodiment, a truly random source is used to define the mapping from each element of a two-dimensional domain of the function to a value in the range of that function. However, for H(x,y) to be truly random, an extremely large table would be required, which would be difficult to initialize, much less store.

For another embodiment, instead of using a random cryptographic function (H(x,y)), a computational approximation of H(x,y) is performed. For example, there are well-known and recognized cryptographic hash functions such as a Federal Information Processing Standard Publication 180-1 entitled "Secure Hash Standard" (Apr. 17, 1995), which specifies Secure Hash Algorithm (SHA-1). One type of approximation S(z) is set forth below in equation (2).

$$h_t = H(ID, T_{source}) = S(z) = S(T_{source} \| ID_s \| T_{source}), \qquad (2)$$

where

"$\|$" denotes a concatenation operation.

In essence, the approximation may be accomplished by using the current source local time ($T_{source}$) and combining such information with the source global identifier ($ID_s$) extracted from the identifier field of the verification packet. The "combining" operation may be accomplished through concatenation as set forth in equation (2) or perhaps through other arithmetic or logical operations. The key hash result $h_t$ is a time sequence of apparently random quantities, due to the characteristics of the random function H(x,y) or the approximation of it using S(z) or some other computation involving a cryptographic hash of the two values or some function(s) of those values.

At block 470, the key hash result $h_t$ is used by both the first computing unit and the second computing unit to select an item to be contemporaneously presented to the users of these devices. For one embodiment, an item may be selected from a table known in advance to all parties or from a table transmitted by the sender. Alternatively, the item may be computed such as through a fractal pattern or via some program producing a graphical image or audible sounds. The program that computes these items would be known to all parties in advance or can be transmitted by the first computing unit within the data field of the verification packet. The presentation of an item includes display of an image on a display screen such as within a special dialog box or adjacent to the name of the user, playback of one or more audible sounds, and the like.

These items are presented to the users and compared (block 480). If the items match (i.e., a successful comparison), if desired, another comparison at the next time interval is conducted by a user to determine whether the items have changed contemporaneously and are also matching (block 490). It is important to note that any comparison is merely a brief recognition that two items are displayed generally contemporaneously and are the same or different. If both conditions are repeatedly satisfied as required by the user, the global identifier is verified.

When the global identifier is a public key, the receiver or verifier of that key might use the global identifier to generate a digital certificate or a local database record that binds the key to information about the keyholder (sender). Such subsequent use might include the generation of: an X.509 Distinguished Name certificate, a PGP e-mail name certificate, a Simple Distributed Security Infrastructure (SDSI) or Simple Public Key Infrastructure (SPKI/SDSI) local name certificate, an X9.59 bank account public key record and the like. Thus, for future uses of the public key, the receiver or verifier could use the generated certificate or record for subsequent key verifications without requiring a physical presence and sensing of a time-varying presentation. If there are no future uses of this verified key, the receiver or verifier need not do any such binding and can instead use the verified key for some immediate purpose.

Figure 5:
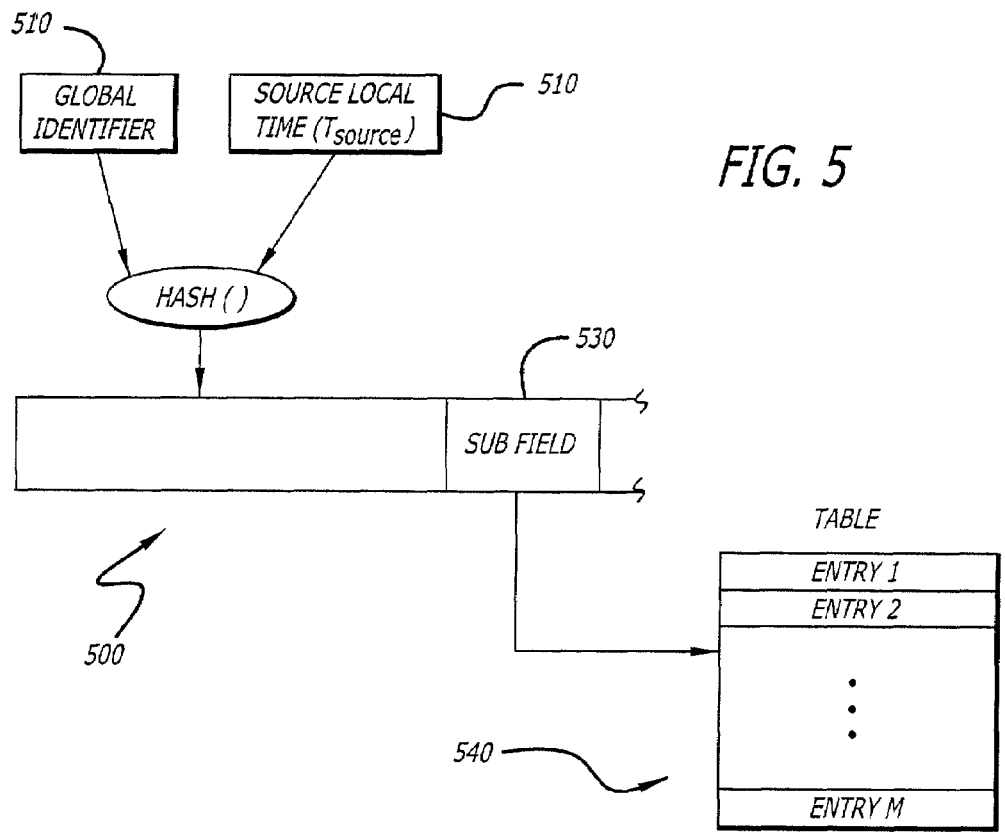
FIG. 5 is a first exemplary embodiment of operations for selecting an item based on bit values obtained from the key hash result.

Referring to FIG. 5, an exemplary embodiment of operations for selecting an item based on bit values obtained from the key hash result is shown. The value of the key hash result 500 is produced by a cryptographic hash operation on at least some unique data 510 (e.g., a global identifier) and a time varying data 520 (e.g., source local time). Normally, the key hash result 500 contains 128 or more bits. It is contemplated, however, that certain key hash results may have more than 128-bits, such as 160-bits. Not all of these bits would be needed to select or compute an item. Rather, each key hash result is reduced to some manageable size, such as M bits for example (where M≦32).

Figure 6:
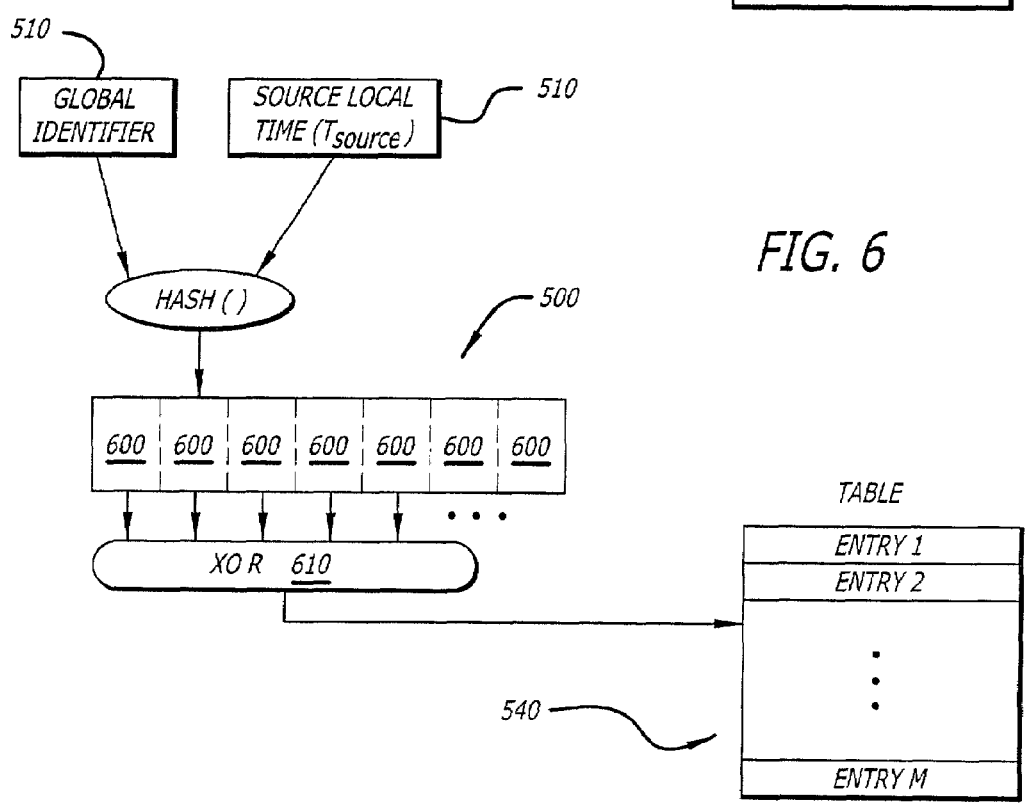
FIG. 6 is a second exemplary embodiment of operations for selecting an item based on bit values obtained from the key hash result.

As shown in FIG. 5, such reduction can be accomplished by a selection of a selected sub-field 530 of the key hash result 500 for use in accessing an entry of a table 540. As shown, the table 540 features $2^M$ entries. Alternatively, the reduction can be achieved by separating the key hash result 500 into a number of fields 600 and performing logical operations on bits of these fields 600 to generate an address for accessing data within certain entries of the table 540. For example, one type of logical operation is an Exclusive OR (XOR) 610 as shown in FIG. 6.

For example, when indexing a table of 256 items using an 8-bit key reduced hash result, at each interval, a new item may be accessed from the table for display as shown by pseudo-code set forth below in Table A. The probability of an interloper interjecting an unauthorized global identifier that would show the same item as the authorized global identifier is 1/256. However, because all of the key hash results are independent of one another, the probability of the interloper being able to mimic two successive items is 1/65,536. The probability continues to shrink geometrically over time as more and more items are perceived contemporaneously. Thus, the level of security achieved by the user depends on the amount of time comparing items contemporaneously presented at the exchanging computing units. If the time interval between display changes is short, then the overall time to achieve cryptographically strong comparison (in excess of 90 bits) is also short. In an ideal embodiment, that time to achieve strong comparison would be less than or equal to the time a human would normally spend in looking at or listening to the sample sequence without spending special effort on the task.

TABLE A

```
{ Time Varying Hash pseudocode (in the manner of PASCAL } }
{ This assumes 256 different icons to be displayed, every 3 seconds. }
    const INT = 3; { time interval in seconds between new displays }
    var
        dt: integer; {delta time between my time and the remote time}
        id: array[ ] of byte; {global identifier -- probably a public key}
        idlth: integer ; {size of the global ID array}
{ Display icon number n, where n is 8 bits }
    procedure display_icon (n :   integer) ; external ;
{ Call this procedure, display_next, every INT seconds,
when (t mod INT = 0). }
    procedure display_next ;
        var
            t: integer ; {time on the remote machine}
            shae: sha_1_env ; {SHA-1 environment state}
            res: byte ; { the result byte }
            i: integer ; { loop variable }
            hv: array [1 . . . 20] of byte ; {key hash result }
        begin
            t:= time_in_seconds−dt ;
            {convert destination time to source
time}
            t:= t − (t mod INT) ; {back up to the start of the current
interval}
            sha_init ( shae ) ; {initialize the environment state}
            sha_accum_int ( shae, t ) ;
            {accumulate an integer's bytes}
            sha_accum_bytes ( shae, id, idlth ) ;
            { accumulate the ID }
            sha_accum_int ( shae, t ) ;
            {accumulate the time bytes again
} sha_final ( shae, hv ) ; {get the key hash result }
            res:= 0 ; { reduce the key hash result to 1
byte } for i:= 1 to 20 do res:= res xor hv[i] ;
            display_icon ( res ) ;
        end ; {display_next }
```

Figure 7:
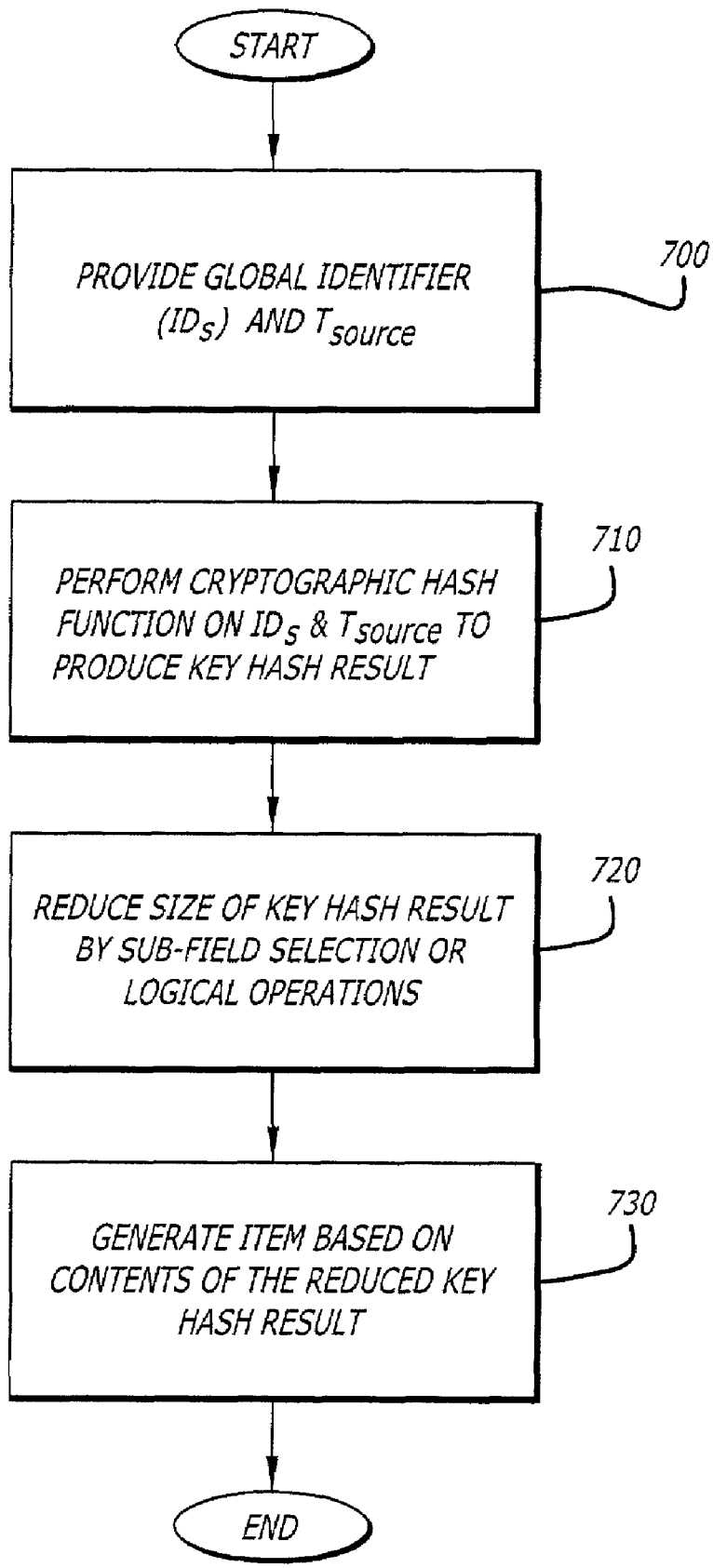
FIG. 7 is an exemplary embodiment of operations for generating an item based on bit values obtained from the key hash result.

Referring now to FIG. 7, as described in FIGS. 5 and 6, the key hash result can be reduced by selection of a sub-field or through logical operations (see blocks 700–720). However, in lieu of using a lookup table for selections of items to be presented to the user, the contents of the reduced key hash result are used to generate the item to be presented (block 730). Namely, bits of the reduced key hash result are used to govern generation of the particular item.

For instance, in one embodiment, the key verification technique may be used to generate different types of images. For the M-bits of the reduced key hash result, at least one bit may be reserved to indicate whether the image is displayed in a vertical or horizontal orientation. Another bit(s) of the reduced key hash result may be used to select the color of the image. Other bits may be used to indicate certain clearly identifiable features of the image or possible image types.

In another embodiment, the key verification technique may be used to generate different series of musical notes or chords. For example, certain bits are used to select the type of musical note and the remainder bits are used to generate duration, meter rate, octave change, etc.

Although these embodiments have described comparison of selected or generated items for users in close proximity and contemporaneous, it is contemplated that such comparison may be performed remotely (e.g., over telephone lines when comparing audible sounds or over television when comparing images). Such comparison may occur substantially contemporaneous or entirely non-contemporaneous when lesser data security is acceptable. The comparison is most effortlessly done when the two presentations are not just contemporaneous but simultaneous. Simultaneity might be prevented by substantial communication delays from sender to receiver. However, since the receiver is using a computed estimate of the sender's time, if the disagreement is one of simple offset (as would be the case when the disagreement was due to transmission delay of the verification packet), the receiver's computation can include a manually controlled offset (perhaps seen by the user/operator as a knob or other continuous control) that can be adjusted to cancel any time difference between the two presentations. In the audio-based embodiment, the time difference might be perceived as an echo, for example, and the knob could be viewed as an echo cancellation control. This echo cancellation does not reduce the security of the key verification process.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   (a) generating a key hash result partially based on a global identifier of a source and an estimated current time at the source;
   (b) producing a first time-varying item based on the key hash result; and
   (c) presenting the first time-varying item for sensory comparison with a second time-varying item being presented at the source and contemporaneous playing back audible sounds associated with both the first and second time-varying items for auditory comparison.

2. The method of claim 1, wherein the presenting of the first time-varying item is contemporaneous with presentation of the second time-varying item if the global identifier of the source is accurately received and the current time at the source has been accurately estimated.

3. The method of claim 1 further comprising:
   (d) repeating (a), (b) and (e) for each subsequent presentation of a newly produced first time-varying item and comparison of the newly produced first time-varying item with a newly produced and presented second time-varying item.

4. The method of claim 3, wherein prior to generating the key hash result, the method further comprises:
   receiving a verification packet from the source, the verification packet including the global identifier of the source and a local time value at which the verification packet was formed at the source.

5. The method of claim 4, wherein the verification packet further includes a table inclusive of items displayed as the first time-varying item and the second time-varying item.

6. The method of claim 4, wherein the verification packet further includes a data field to contain information to be transferred.

7. The method of claim 6, wherein the information includes a lookup table for selection of the item to be presented.

8. The method of claim 4, wherein the verification packet further includes a digital signature of contents of the verification packet.

9. The method of claim 4, wherein the generating of the key hash result further comprises
   computing a clock skew by recording a receipt time upon which the verification packet is received and computing a time difference between the receipt time and the local time value;
   computing the estimated current time at the source corresponding to a current time at a destination based on the clock skew; and
   performing a cryptographic hash operation on a combination of at least the global identifier and the estimated current time to generate the key hash result.

10. The method of claim 9, wherein the producing of the first time-varying item includes accessing an entry of a lookup table using the key hash result and recovering contents of the entry as the first time-varying item.

11. The method of claim 9, wherein the presenting of the first time-varying item for sensory comparison comprises displaying the first time-varying item contemporaneously with a display of the second time-varying item for visual comparison.

12. The method of claim 9, wherein producing of the first time-varying item comprises accessing bits of at least a portion of the key hash result to determine horizontal or vertical orientation of the first time-varying item being a displayable image.

13. The method of claim 9, wherein producing of the first time-varying item comprises accessing bits of at least a portion of the key hash result to determine one or more selected colors of the the first time-varying item being a displayable image.

14. The method of claim 9, wherein producing of the first time-varying item comprises accessing bits of at least a first portion of the key hash result to a type of musical note of the first time-varying item being an audible sound.

15. The method of claim 14, wherein producing of the first time-varying item further comprises accessing bits of at least a second portion of the key hash result to determine one of a duration, a meter rate or an octave change of the audible sound.

16. A software stored in platform readable medium executed by internal circuitry within a computing unit, the software including software modules causing the computing unit to perform the following function:
   (a) a first software module to periodically generate a key hash result based on at least a global identifier of a source and an estimated current time at the source providing the global identifier;
   (b) a second software module to produce successive images varied after each selected time interval for display on a display screen of the computing unit, a first time-varying image of the successive images being based on a first key hash result; and
   (c) a third software module to present the successive images for sensory comparison with a succession of time-varying images at the source.

17. The software of claim 16, wherein the first, second and third software modules repeatedly generate successive key hash results, produce a first time-varying image of the successive images using the first key hash result and display the first time-varying image for comparison with a second time-varying image being one of the successive images produced and displayed at the source.

18. The software of claim 17, wherein the first software module generates the first key hash result through computation of a clock skew by recording a receipt time upon which the verification packet is received and computing a time difference between the receipt time and the local time value, computation of the estimated current time at the source corresponding to a current time at a destination using the clock skew, and performance of a cryptographic bash operation on a combination of at least the global identifier and the estimated current time.

19. The software of claim 18, wherein the second software module produces the first time-varying image by accessing an entry of a lookup table using the first key bash result and recovering contents of the entry as the first time-varying image.

20. The software of claim 16 further comprising:
a fourth software module to receive a verification packet from the source, the verification packet including the global identifier of the source and a local time value at which the verification packet was formed at the source.

21. A network comprising:
a first computing unit to (i) transmit successive verification packets each including a static global identifier and a varying local time value realized at the first computing unit during formation of that verification packet, (ii) generate successive first time-varying items based on the global identifier and local time value, and (iii) present the first time-varying items in successive fashion; and
a second computing unit to (i) receive each verification packet, (ii) compute a clock skew to determine a time difference between the first computing unit and the second computing unit in response to receipt of a first verification packet, (iii) generate successive second time-varying items based on information derived from the global identifier and the local time value of the first computing unit and (iv) present the second time-varying items for sensory comparison with the first time-varying items to verify usage of the global identifier by both the first computing unit and the second computing unit.

22. The network of claim 21, wherein the second computing unit comprises:
a casing;
an input/output (I/O) interface;
a device that provides sensory data for a user, the device being integrated into the casing; and
internal circuitry contained within the casing and controlling information presented by the device, the internal circuitry to generate a key hash result based on the global identifier of the first computing unit remotely located from the second computing unit and the local time value at the first computing unit.

23. The network of claim 22, wherein the internal circuitry of the second computing unit is a memory and a processor accessing information from the memory.

24. The network of claim 22, wherein the I/O interface of the second computing unit is an antenna to receive signals from the first computing unit and provide the signals to the internal circuitry for processing.

25. The computing unit network of claim 22, wherein the I/O interface of the second computing unit to receive a verification packet including at least the global identifier and the local time value at which the verification packet was formed prior to transmission to the second computing unit.

26. The network of claim 25, wherein the internal circuitry of the second computing unit generates the key hash result based on the global identifier, the local time value at the first computing unit and data contained in a data field of the verification packet.

27. The network of claim 22, wherein the device of the second computing unit is a display screen that displays the information being time-varying images.

28. The network of claim 22, wherein device of the second computing unit is at least one speaker that playback audible sounds which vary in time based on a value of the key hash result.

29. The network of claim 22, wherein device of the second computing unit is at least a tactile device that produces Braille patterns which vary in time based on a value of the key hash result.

30. The network of claim 21, wherein the first computing unit communicates with the second computing unit over a wireless link.

31. The network of claim 21, wherein verification that the second computing unit bas received the global identifier of the first computing unit when the second time-varying items are presented and changed contemporaneously with the first time-varying items.

32. A software stored in platform readable medium executed by internal circuitry within a computing unit, the software including software modules causing the computing unit to perform the following function:
(a) a first software, module to periodically generate key hash results based on at least a global identifier of a source and an estimated current time at the source providing the global identifier;
(b) a second software module to produce successive audible sounds varied after each selected time interval for playback over speakers of the computing unit, a first time-varying audible sound of the audible sounds being based on a First key hash result of the key hash results; and
(c) a third software module to playback the successive audible sounds for sensory comparison with a succession of audible sounds contemporaneously produced at the source in order for the user of the computing unit to verify accurate receipt of the global identifier of the source.

* * * * *

UNITED STATES PATENT AND TRADEMARK OFFICE
CERTIFICATE OF CORRECTION

PATENT NO. : 7,246,235 B2
APPLICATION NO. : 09/896088
DATED : July 17, 2007
INVENTOR(S) : Ellison et al.

It is certified that error appears in the above-identified patent and that said Letters Patent is hereby corrected as shown below:

In column 5, at line 3, delete "," and insert --.--.

In column 9, at line 39, delete "(e)" and insert --(c)--.

In column 10, at line 65, delete "bash" and insert --hash--.

In column 11, at line 3, delete "bash" and insert --hash--.

Signed and Sealed this

Twenty-ninth Day of April, 2008

JON W. DUDAS
*Director of the United States Patent and Trademark Office*